Patented Nov. 22, 1949

2,488,559

UNITED STATES PATENT OFFICE 2,488,559

PENICILLIN EXTRACTION PROCESS

Mott Souders, Jr., Piedmont, Calif., assignor to Shell Development Company, San Francisco, Calif., a corporation of Delaware No Drawing. Application February 2, 1948, Serial No. 5,902

6 Claims. (Cl. 260—302)

This invention is concerned with a method for extracting penicillin from an aqueous solution containing penicillin, alone or together with other organic acids naturally associated therewith in aqueous broths derived from cultures. Such aqueous solution may contain also other impurities naturally occurring in such broth.

Penicillin, an organic acid, is a bacteriostatic agent produced during the growth of certain molds such as *Penicillium notatum*. It is an important drug for combating many diseases and preventing the spread of infections. Penicillin may be produced from at least two different types of mold growth, one from a submerged culture and another from a surface culture. The instant method is applicable to the extraction of penicillin from either type of culture. During the formation of penicillin in these cultures, there are also produced a number of other organic acids, some weaker and some stronger than penicillin. From the culture is obtained an aqueous solution or broth containing various amounts of these different organic acids, other organic liquids and solids, and from about 0.001% to 0.03% of penicillin.

Penicillin acid decomposes very easily at temperatures slightly above 0° C. Strong acids, strong bases, heavy metals and certain other reagents destroy it. Accordingly, its extraction from the broth is carried out as closely to 0° C. as possible without freezing the water present. All acids or bases introduced to control the pH value throughout the systems are added in dilute solutions. Extractions in even dilute acids and bases are carried out as rapidly as possible.

It is known to concentrate penicillin from such a broth by extraction with amyl acetate. (See British Journal of Experimental Pathology, vol. 23, June 1942, No. 3, pages 103–122.) Industrially, it is common to subject the penicillin to successive extractions to obtain progressive concentrations. For example, the crude broth may be acidified to a pH of 2 and mixed with an equal volume of solvent to transfer the penicillin (together with other organic acids) to the solvent; the solvent layer is then separated from the aqueous phase and washed with one tenth its volume of a buffered aqueous solution having a pH of about 6, thereby transferring the penicillin into a new aqueous phase having one tenth of the original volume. This operation may be repeated, i. e., the aqueous phase may be acidified and again extracted by the same procedure to produce a second aqueous phase having one hundredth of the volume of the original crude broth.

Each of these successive operations, therefore, usually involves an extraction step (wherein the penicillin is dissolved in the amyl acetate), followed by a washing step (wherein the penicillin is washed out of the amyl acetate). Solvent is recovered by distillation from each solvent phase subsequent to the washing step. It is usually impractical to recover solvent from the residual aqueous phase separated in the extraction step. In the practical application of such a process it was found that excessively large amounts of solvent are lost with the residual aqueous phase or phases, thereby greatly increasing the cost of the process. Further, difficulties were experienced in the recovery of the solvent by distillation.

It is an object of this invention to provide an improved method for extracting penicillin from an aqueous solution thereof whereby certain economies may be realized. Specifically, it is an object to reduce the loss of solvent incident to the process. A further object is to provide a process wherein the penicillin may be recovered with a greater yield and/or with a lower loss of recovery solvent. Still another object is to provide a process wherein the recovery of the solvent is effected more easily than in the prior art process.

In accordance with the present invention penicillin is extracted from an aqueous solution thereof with a methyl isobutyl ketone solvent under conditions to form two liquid phases, viz., a solvent extract phase containing penicillin dissolved in the methyl isobutyl ketone solvent, and a residual aqueous phase, at a low pH, preferably between about 1.8 to 3.5, such as a pH of 2.0. The resulting liquid phases are separated, and the penicillin separated from the solvent in any desired method, e. g., by washing with water at a higher pH, preferably between about 4.0 and 9.0, such as a pH of 7.0. The washed solvent phase may be distilled to recover the solvent therefrom for further use in the same process. The aqueous penicillin solution produced in the washing step may be treated in any desired manner for further purification and/or concentration of penicillin. Thus, it may be acidified and extracted again with a methyl isobutyl ketone solvent in the manner described above.

It was found that considerable economies are effected by this invention. Particularly, less solvent is lost with the residual aqueous phase than in the prior methods, although methyl isobutyl ketone has a slightly higher water solubility in water than amyl acetate and would be expected, therefore, to be lost to a greater extent. Further the methyl isobutyl ketone extract is readily separated from the residual aqueous phase, and the solvent is easily recovered by distillation.

The initial aqueous solution extracted according to this process may contain only penicillin, or may contain penicillin together with other organic acids naturally occurring therewith in the broth. It will be understood that the penicillin recovered by this process will, therefore, not necessarily be pure, but may contain certain impurities, such as other organic acids naturally associated therewith as well as other impurities. Thus, when the methyl isobutyl ketone solvent is used to extract a broth which may have been previously untreated, or treated only by filtration for the removal of undissolved solids, the extract will contain penicillin together with weaker organic acids, and may, in addition, contain stronger organic acids, depending upon the pH at which the extraction is carried out, and the ratio of solvent to broth.

While I prefer to employ as a solvent pure or substantially pure methyl isobutyl ketone (i. e., methyl isobutyl ketone containing such minor amounts of water as are carried over in the distillation recovery step) the invention is not limited thereto, and may be practiced with a solvent consisting predominantly of methyl isobutyl ketone and minor amounts of other solvents, particularly water-immiscible solvents. Examples are esters having 5 or more carbon atoms of monohydric alcohols with fatty acids such as amyl acetate; alcohols of 4 or more carbon atoms, such as n-butyl alcohol; aliphatic ketones of 4 or more carbon atoms, such as di-isopropyl ketone and di-isobutyl ketone; and chlorinated hydrocarbons such as chloroform.

Because penicillin is more soluble in the methyl isobutyl ketone solvent and the alkali metal salts of penicillin are more soluble in water, the aqueous solution or fermentation broth is acidified prior to extraction. It is desirable that the pH of the acidified aqueous solution or broth be between about 1.8 and 3.5, e. g., about 2.0 and that a dilute aqueous acid such as sulfuric, phosphoric or hydrochloric acid from about 0.4 to 1.2 molality, be used as the acidifying agent. The invention is not, however, limited to the use of this preferred range of pH values or concentrations of acidifying agents. Thus, I may use pH values as low as 1.6; however, there is danger of deactivating penicillin when too low a pH is used and, further, the possible disadvantage that organic acids stronger than penicillin, which would remain in the residual aqueous phase at higher pH values, are dissolved to a greater extent in the solvent. The latter may, in certain instances, not be objectionable, as when it is desired to recover the maximum quantity of penicillin from the broth with the methyl isobutyl ketone solvent and to separate the penicillin from the stronger acids in a subsequent treatment. The use of higher pH values, e. g. up to 4.0, is also possible; however, this results in dissolving less penicillin in the solvent.

Methyl isobutyl ketone solvent may be used in any approved extraction technique and equipment, e. g., in batch or continuous extractions, wherein the solvent and acidified aqueous penicillin solution are mixed and thereafter allowed to settle into a lower aqueous layer and a supernatant solvent extract layer, which layers are then separated. I may effect the extraction in countercurrent, using any suitable equipment, such as a single column having perforated trays, packing or other contact means and having the necessary feed and exit lines; or it may comprise a series of mixers and settlers.

Solvent to aqueous feed ratios may vary between conventional limits which, as a rule, are between 1:20 and 5:1, depending upon a variety of factors, such as the pH and the desired yields. The temperature should be maintained as close to 0° C. as possible to avoid deactivation of the drug.

I may further improve the purity of the extract by scrubbing the solvent extract solution separated from the residual aqueous phase, either in a single stage or countercurrent extraction, with water. The resulting scrubbing water is in such a case preferably combined with the aqueous feed solution to the main extraction. The scrubbing is best carried out by buffering the scrubbing water to a pH between 7 and the pH of the acidified aqueous feed to the extraction. Buffers which are suitable for use in the water scrubbing step should have low distribution constants between the solvent and water, i. e., they should be preferentially soluble in water. Substantially neutral or acid salts of alkali metals with weak acids, such as bicarbonates, bisulfides, phosphates, metaphosphates, sulfites, oxalates, phthalates, citrates, tartrates, etc., may be used.

The penicillin may be washed out of the solvent extract by aqueous solutions containing alkali or alkali metal bases or basic-reacting salts, such as sodium, potassium, calcium or barium hydroxide, in the concentration to produce a pH of between about 4 and 9 in the water phase. I may buffer this solution by the use of any of the buffers previously described. Thus, a 0.10 molar aqueous solution of $Na_2HPO_4$ containing a small quantity of HCl to bring the pH to 6.95 may be used.

*Example*

Aqueous penicillin broth, derived from a submerged culture rich in penicillin G was filtered to remove undissolved solids, acidified with dilute (about 6% by vol.) aqueous sulfuric acid to a pH of 2, and continuously mixed in an agitator with an equal volume of an extraction solvent. After intimate mixing the resulting dispersion was flowed through a centrifuge to separate the major portion of the residual aqueous phase, a minor portion of the aqueous phase remaining in the solvent extract phase. The latter was settled to separate the entrained, minor portion of the aqueous phase. The settled solvent extract phase was washed in a two-stage countercurrent extractor with one-twentieth its volume of water, aqueous sodium bicarbonate being introduced into both stages so as to maintain the pH between 6.8 and 7.0 in the first stage (to which the rich solvent extract base was fed), and at about 8.5 in the second stage. These operations were all carried out at temperatures between 0° C. and +5° C. The washed solvent phase was then distilled at a slight vacuum.

In a plant run as described above, amyl acetate was used as the solvent for a one month period and methyl isobutyl ketone over a sixteen day period. Solvent losses were determined from daily composite samples of the rejected aqueous broth. These losses include overall losses including those due to the formation of aqueous emulsion and those due to solution of the solvent in the water. The average results were:

| Solvent | Per cent by Vol. of Solvent in Rejected Aqueous Phase |
|---|---|
| Amyl acetate | 4.0 |
| Methyl isobutyl ketone | 2.0 |

The efficiency of the penicillin recovery in the sodium bicarbonate solution was about 91% in both runs. In both runs the efficiency of the distillation recovery was about 98%.

The foregoing results show that, although methyl isobutyl ketone is more soluble in water than amyl acetate, only half as much solvent is lost according to this process. This surprising result is due to the fact that methyl isobutyl ketone separated readily from the aqueous solution without the formation of emulsions which carry away large quantities of valuable solvent when amyl acetate is used.

This application is a continuation-in-part of my application, Ser. No. 540,960, filed June 19, 1944.

I claim as my invention:

1. In a process for extracting penicillin from an aqueous solution thereof by contacting said solution at a pH between about 1.6 and 4.0 with a solvent to produce a solvent extract phase containing penicillin and a residual water phase, and separating said phases, the improvement of using a solvent consisting predominantly of methyl isobutyl ketone.

2. In a process for extracting penicillin from an aqueous solution thereof containing organic acids naturally associated therewith comprising the steps of contacting said solution at a pH between about 1.6 and 4.0 with a solvent to form a solvent extract phase containing penicillin and a residual water phase, and separating said phases, the improvement of using a solvent consisting predominantly of methyl isobutyl ketone.

3. The process according to claim 2 wherein the extract phase is washed with water at a pH between about 4 and 9 to form an aqueous solution containing penicillin and the solvent is recovered from the washed extract phase by distillation.

4. In a process for extracting penicillin from an aqueous solution thereof by contacting said solution with a solvent at a pH between about 1.8 and 3.5 to produce a solvent extract phase containing penicillin and a residual water phase, and separating said phases, the improvement of using methyl isobutyl ketone as the solvent.

5. In a process for extracting penicillin from an aqueous solution thereof by contacting said solution with a solvent at a pH of about 2 to produce a solvent extract phase containing penicillin and a residual water phase, and separating said phases, the improvement of using methyl isobutyl ketone as the solvent.

6. In a process for extracting penicillin from fermentation broth by contacting said broth with a solvent at a pH of between about 1.6 and 4.0 to produce a solvent extract containing penicillin and a residual water phase, and separating said phases, the improvement of using methyl isobutyl ketone as the solvent.

MOTT SOUDERS, Jr.

REFERENCES CITED

The following references are of record in the file of this patent:

UNITED STATES PATENTS

| Number | Name | Date |
|---|---|---|
| 2,459,315 | Goldberg et al. | Jan. 18, 1949 |

OTHER REFERENCES

Jordan: "Technology of Solvents" (1937), p. 242.

Abraham et al.: "The Lancet," Aug. 16, 1941, p. 179.

Abraham et al.: "The British Journal of Exptl. Path.," vol. 23, June 1942, pp. 104 and 108.

Cutter Report—CMR–Cu–1, June 15, 1944, pp. 32, 33, 34.

"Chem. and Met. Eng.," Nov. 1945, p. 384.

Rowley et al.: "J. Soc. Chem. Ind.," Aug. 1946, pp. 238, 239 and 240.

Smith: "J. Soc. Chem. Ind.," Oct. 1946 (read before the London Section May 6, 1946), page 310.